United States Patent
Horev et al.

(10) Patent No.: US 10,070,156 B2
(45) Date of Patent: Sep. 4, 2018

(54) VIDEO QUALITY OF EXPERIENCE BASED ON VIDEO QUALITY ESTIMATION

(71) Applicant: ARRIS Enterprises, Inc., Suwanee, GA (US)

(72) Inventors: Zvika Horev, Raanana (IL); Moshe Maor, Ramat Gan (IL); Chris Busch, Arnprior (CA); Uzi Cohen, Petach Tikva (IL)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/860,904

(22) Filed: Sep. 22, 2015

(65) Prior Publication Data
US 2016/0088322 A1    Mar. 24, 2016

Related U.S. Application Data

(60) Provisional application No. 62/053,507, filed on Sep. 22, 2014.

(51) Int. Cl.
*H04N 21/234*     (2011.01)
*H04N 21/2343*     (2011.01)
(Continued)

(52) U.S. Cl.
CPC ... *H04N 21/23418* (2013.01); *H04N 21/2385* (2013.01); *H04N 21/23439* (2013.01); *H04N 21/2401* (2013.01); *H04N 21/2402* (2013.01); *H04N 21/254* (2013.01); *H04N 21/25833* (2013.01); *H04N 21/64738* (2013.01); *H04N 21/8456* (2013.01)

(58) Field of Classification Search
CPC combination set(s) only.
See application file for complete search history.

(56) References Cited

U.S. PATENT DOCUMENTS

2008/0201748 A1   8/2008   Hasek et al.
2009/0031384 A1   1/2009   Brooks et al.
(Continued)

FOREIGN PATENT DOCUMENTS

EP    2575302 A1   4/2013
WO   2007/078503 A2   7/2007

OTHER PUBLICATIONS

PCT Search Report & Written Opinion, RE: Application No. PCT/US2015/051388, dated Jan. 7, 2016.

*Primary Examiner* — Alexander Gee
(74) *Attorney, Agent, or Firm* — Bart A. Perkins

(57) ABSTRACT

Methods, systems, and computer readable media can be operable to facilitate an analysis and control of video quality of experience (VQoE) of services delivered to one or more client devices. A content version segment may be selected for delivery to a client device based upon an estimation of the video quality experienced by the client device and the bandwidth available for delivering content to the client device. Video quality estimation may be based upon information associated with the encoding of a media stream coupled with one or more parameters of the client device receiving the media stream. Video quality estimation for one or more client devices may be aggregated and displayed to a service operator and/or may be used to inform content selection decisions in an adaptive bit-rate delivery method.

10 Claims, 9 Drawing Sheets

(51) Int. Cl.
  *H04N 21/2385*  (2011.01)
  *H04N 21/24*  (2011.01)
  *H04N 21/254*  (2011.01)
  *H04N 21/258*  (2011.01)
  *H04N 21/647*  (2011.01)
  *H04N 21/845*  (2011.01)

(56) References Cited

U.S. PATENT DOCUMENTS

| | | | | |
|---|---|---|---|---|
| 2009/0300204 | A1* | 12/2009 | Zhang | H04N 21/2358 709/231 |
| 2011/0238789 | A1* | 9/2011 | Luby | H04N 21/23106 709/219 |
| 2013/0089150 | A1* | 4/2013 | Tanchenko | H04N 19/176 375/240.18 |
| 2013/0101052 | A1* | 4/2013 | Kaye | H04N 21/23655 375/240.26 |
| 2014/0196065 | A1* | 7/2014 | Oh | H04N 21/2383 725/14 |
| 2014/0282792 | A1* | 9/2014 | Bao | H04N 21/44004 725/116 |
| 2015/0117198 | A1* | 4/2015 | Menezes | H04L 47/2433 370/235 |
| 2015/0128162 | A1* | 5/2015 | Ionescu | G06Q 30/00 725/14 |
| 2017/0324985 | A1* | 11/2017 | Holden | H04N 21/2343 |

\* cited by examiner

VIDEO QUALITY OF EXPERIENCE BASED ON VIDEO QUALITY ESTIMATION

CROSS REFERENCE TO RELATED APPLICATION

This application is a non-provisional application claiming the benefit of U.S. Provisional Application Ser. No. 62/053,507, entitled "Video Quality of Experience Monitoring and Optimizing System," which was filed on Sep. 22, 2014, and is incorporated herein by reference in its entirety.

TECHNICAL FIELD

This disclosure relates to the monitoring, provisioning, and analysis of video quality of experience for media received at a display device.

BACKGROUND

Technology for streaming video continues to be developed, and advances in technology have led to increases in available bandwidth for both wired and wireless delivery mechanisms used to deliver services to a customer. Moreover, the quality at which media may be displayed at a client device continues to improve. Networks used for delivering these streaming video services have become dominated by video streaming.

In order to facilitate quicker initiation of content playback at a client device, progressive download methods are commonly selected for content delivery in place of traditional delivery methods wherein a media file is fully downloaded prior to beginning playback of the media. Progressive download, is a method wherein video is transferred to a client device as a file using the HTTP application layer protocol. As soon as enough video is received at the client device, the client device may begin playback of the video. Progressive downloading presents various problems, including, but not limited to insufficient bandwidth, fluctuations in available bandwidth, fluctuations in video encoding bit-rate, excessive bandwidth available, issues created during trickplay of a stream, and various others.

The available bandwidth on a link between a video server and a client device may be lower than the video stream bandwidth. In such scenarios, the video will not be downloaded fast enough and as a result the client device will be starved. Thus, insufficient bandwidth may result in intermittent pausing/stopping during playback.

The network connecting the server and the client device typically includes many links between routers, each having a different available bandwidth. The number of users sharing each link can be large and can vary over time. Moreover, wireless local area network (WLAN) (e.g., Wi-Fi links), which are typically the last hop in a route, may exhibit fluctuations in available bandwidth. These fluctuations in available bandwidth may adversely affect a media session that is being delivered to a client device. For example, in a scenario where the link bandwidth fluctuates over time, the user may experience problems even though the average link bandwidth is higher than the nominal stream bandwidth. This may result from a local minimum in the link bandwidth which will not enable a continuous streaming.

A video encoder may encode different parts of the video stream in different bitrates. This can happen locally, on a scale of a few seconds, even in the case where the encoder was configured to output a variable bit-rate (VBR) stream. During periods when the encoded video bit-rate is higher than the average, it is possible that the available bit-rate for the client device is insufficient for continuous playback. In such a case, the playback may freeze, even though on average the bit-rate available for the client device is sufficient for the video.

When the available bandwidth between the server and the client device is higher than the nominal stream bandwidth, video data may accumulate at the client device's video playback buffer. If the client device stops the video playback before the entire stream is played, all of the accumulated data at the playback buffer may be discarded without being output from the buffer for viewing.

When a client device requests a certain remote video asset, the video playback may not start upon the arrival of the first video byte to the client device. Rather, the video playback is delayed, in order to allow accumulation of video playback buffer at the client device. This delay also occurs when the client device seeks forward or backward in the media content, thus making the previously transmitted data irrelevant. This delay may have a typical length of several seconds, and can result in degradation to the user experience.

A common link layer protocol for video transmission over the Internet is transmission control protocol (TCP). According to TCP, a dynamic attempt is made to estimate a link's parameters (e.g., bandwidth, Round Trip Time (RTT), etc.), and transmission is adjusted accordingly. Further, an attempt is made to share available bandwidth evenly between TCP client devices. This probing functionality has a cost in terms of transmission efficiency. As a result, a sender that knows the available bandwidth for the stream may better utilize the link.

Progressive downloading has become the preferred approach for video streaming by many content providers, and multiple attempts have been made to solve the various problems presented by this delivery method.

A content delivery network (CDN) was developed to alleviate bandwidth fluctuation issues created by progressive downloading. A CDN is a network of caching proxy servers, and is commonly located as close as possible to a client device. A CDN shortens the distance between the client device and the video server, resulting in a wider channel with less bandwidth fluctuation. However, the solution for the bandwidth problems is only partial, because the route between the client device and the proxy server may still exhibit problems of insufficient or fluctuating bandwidth.

Bit rate throttling is a feature in a video streaming server that controls the rate at which data is being transmitted to a user. The video streaming server analyzes the video file sent to the user, determines its encoding bit rate, and sets its transmission bit rate accordingly. When a new user starts receiving video, the video streaming server sets the transmission bit rate to be higher than the encoding bit rate in order to reduce the startup delay at the user device.

Adaptive bit-rate (ABR) is a method that enables each client device to receive an appropriate version of a piece of multimedia content (e.g., video), according to its available bandwidth. For example, a piece of multimedia content (e.g., video) is encoded in several versions, each version being encoded in a different bit-rate. Using ABR, each version of the content is encoded in segments. A segment is a part of the content stream that can be concatenated to its subsequent segment from a different version in a way which appears seamless to a media player. As an example, segment duration is typically somewhere between 2-10 seconds in duration.

The client device may be configured to sense the available bandwidth, and to select the appropriate version accordingly. For example, an adaptive streaming client device can measure its available bandwidth and playback buffer state, and according to those inputs, can request the segment of the appropriate version of the content.

The ABR method attempts to resolve the problem of having too little and too much bandwidth, as well as addressing fluctuation in bandwidth. ABR also improves the start/seek delay by selecting versions with smaller sizes when the playback buffer is low. However, ABR also creates a new quality of experience (QoE) problem, whereby the quality of the received stream is inconsistent.

When bandwidth is equally shared between different types of client devices, one client device may be able to receive a higher quality version of a certain piece of content than another client device. For example, high quality video for a high-definition television may consume more bandwidth than a high quality version of video encoded for a mobile device (e.g., tablet, mobile phone, etc.). Inequality in the QoE (or video quality) can also occur between client devices of the same type. For example, when encoding a video sequence, the encoder may require more bits for complex scenes than the bits required for a simple scene. In a scenario where one client device displays a complex scene, which requires a higher bit rate for a certain quality, and another client device displays a simple scene, which requires a lower bit rate for the same quality, the TCP, being oblivious to video quality, will receive equal bandwidth for both user devices, hence causing an inequality in video quality.

ABR attempts to solve the problems of fluctuating available bandwidth and fluctuating video encoding bit-rate, but does so based only on data received at the user device. However, consistent video quality may be an important factor to consider in ABR decisions. Moreover, service providers may benefit from understanding what a user is experiencing in order to provide a better service. When a service provider is able to understand the quality of a service that is received at a customer premise, or even more specifically, on a certain client device, the service provider can more effectively and efficiently solve an issue with the provided service. Therefore, a need exists for improved methods and systems for monitoring video quality of experience (VQoE) of video services received at client devices.

BRIEF DESCRIPTION OF THE DRAWINGS

Like reference numbers and designations in the various drawings indicate like elements.

DETAILED DESCRIPTION

Figure 1:
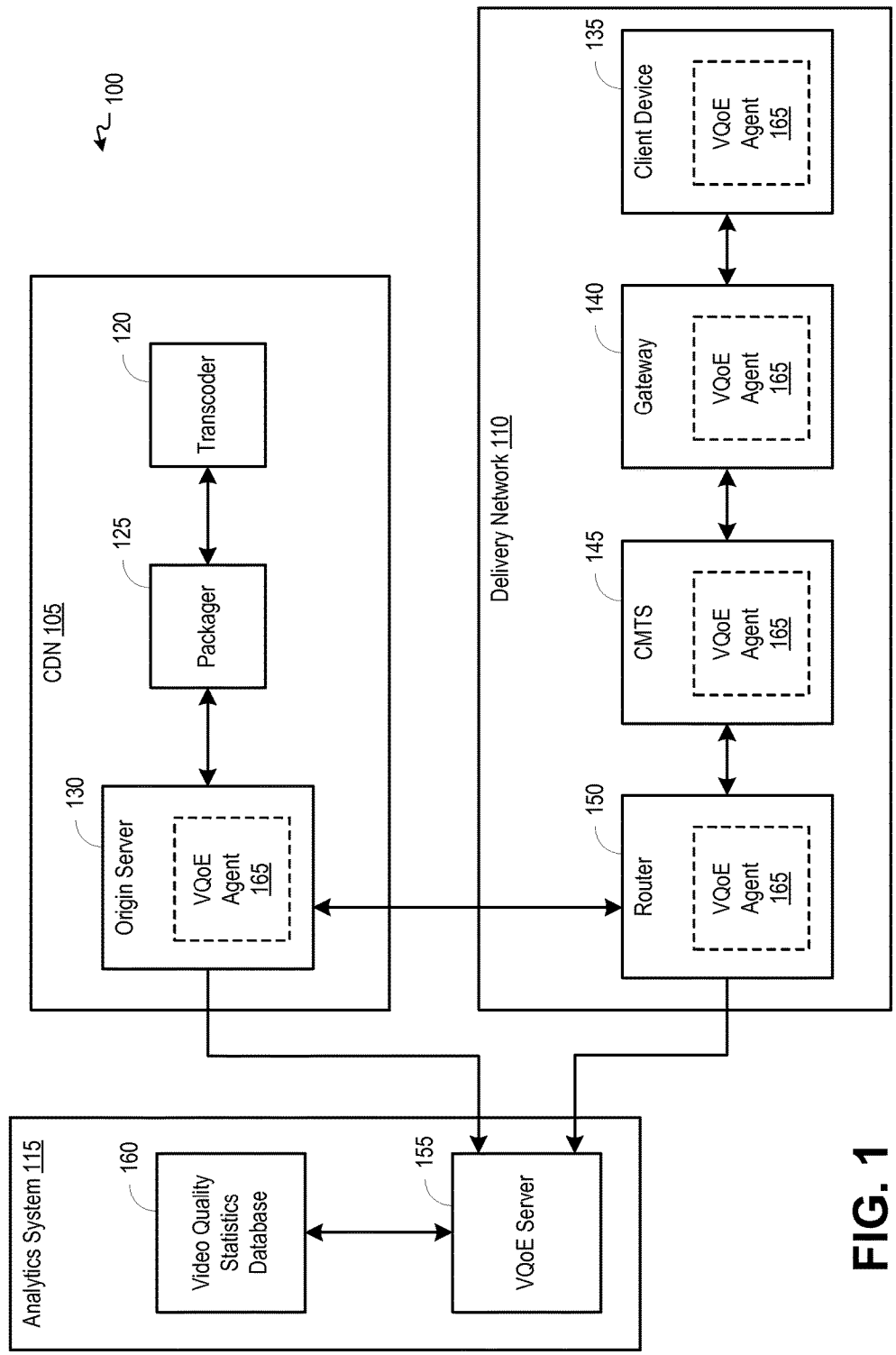
FIG. 1 is a block diagram illustrating an example network environment operable to facilitate an analysis and control of video quality of experience (VQoE) of services delivered to one or more client devices.

Methods, systems, and computer readable media can be operable to facilitate an analysis and control of video quality of experience (VQoE) of services delivered to one or more client devices. A content version segment may be selected for delivery to a client device based upon an estimation of the video quality experienced by the client device and the bandwidth available for delivering content to the client device. Video quality estimation may be based upon information associated with the encoding of a media stream coupled with one or more parameters of the client device receiving the media stream. Video quality estimation for one or more client devices may be aggregated and displayed to a service operator and/or may be used to inform content selection decisions in an adaptive bit-rate delivery method.

In embodiments, a system can analyze VQoE of services delivered to client devices and can output VQoE information associated with the client devices. The system can have a centralized architecture and can control bandwidth and QoE. The system, method and computer readable medium can consider the available bandwidth over the entire network, the temporal video quality of the video streams, the properties of the user devices, and/or the playback buffer state in each of the user devices in order to provide an efficient resource allocation.

As described previously, TCP connections share bandwidth equally, but equal bandwidth does not mean equal video quality, as seen in the following example. Consider two client devices sharing the same channel of 4 mbps. One client device is a high-definition television, and video for the high-definition television is encoded in the following versions: HIGH—4 mbps, MED—3 mbps, LOW—2 mbps. The other client device is a smartphone, with a lower screen resolution than the high-definition television, and video for the smartphone is encoded in the following versions: HIGH—2 mbps, MED—1 mbps, LOW—0.5 mbps. The TCP associated with each client device will attempt to achieve an equal share of the channel's bandwidth, thus each client device will be allocated 2 mbps of the 4 mbps available. In this example, the smartphone will experience a high video quality (e.g., HIGH—2 mbps), while the high-definition television will suffer from a low video quality (e.g., LOW—2 mbps).

An embodiment of the invention described herein may include a method comprising: (a) retrieving device parameter information associated with a client device receiving a media stream associated with a piece of media content, wherein the media stream comprises one or more video segments associated with a first version of a plurality of versions of the piece of media content, the first version of the piece of media content being selected for delivery to the client device based upon an amount of bandwidth available for delivery of the media content to the client device; (b) retrieving video quality estimation information associated with the media stream being received at the client device, wherein video quality estimation information is generated for each respective version of the plurality of versions of the piece of media content and is based, at least in part on an encoding bit-rate associated with the respective content version and display parameters associated with the client device, and wherein video quality estimation information provides an indication of the video quality of experience for a display of the media content at the client device; (c) aggregating the device parameter information and video quality estimation information; and (d) modifying the selection of a version of the piece of media content based upon the aggregated device parameter information and video quality estimation information.

According to an embodiment of the invention, the selection of a version of the piece of media content is modified to select a second version of the piece of media content, the second version of the piece of media content being associated with a higher bit-rate than a bit-rate associated with the first version of the piece of media content, and the method described herein further comprises: (a) determining whether enough bandwidth is available to support the delivery of the second version of the piece of media content to the client device; and (b) if the determination is made that there is not enough bandwidth available to support the delivery of the second version of the piece of media content to the client device, increasing an allocation of bandwidth to the client device to provide enough bandwidth to support the delivery of the second version of the piece of media content to the client device.

According to an embodiment of the invention, modifying the selection of a version of the piece of media content comprises outputting a message to a device controlling content version selection for the client device, the message serving to notify the device to request one or more media segments associated with a second version of the piece of media content from a content origin server.

According to an embodiment of the invention, modifying the selection of a version of the piece of media content comprises outputting a message to the client device, the message serving to notify the client device to request one or more media segments associated with a second version of the piece of media content from a content origin server.

According to an embodiment of the invention, video quality estimation information is generated for each switch unit of each media stream, wherein a switch unit comprises a closed group of pictures.

According to an embodiment of the invention, video quality estimation is generated for one or more segments associated with one or more versions of the piece of media content by performing video quality estimation on one or more segments of a source stream for the piece of media content.

According to an embodiment of the invention, video quality estimation information is generated for each respective version of the plurality of versions of the piece of media content by performing video quality estimation on one or more uncompressed media stream segments.

According to an embodiment of the invention, video quality estimation information is generated for each respective version of the plurality of versions of the piece of media content by performing video quality estimation on one or more compressed media stream segments.

According to an embodiment of the invention, performing video quality estimation comprises performing peak signal-to-noise ratio (PSNR) normalization on one or more compressed media stream segments.

According to an embodiment of the invention, the video quality estimation information is embedded in the media stream being output to the client device, the video quality estimation information is extracted from the media stream by an access device forwarding the media stream to the client device, and the extracted video quality estimation information is retrieved from the access device.

According to an embodiment of the invention, video quality estimation information is retrieved from a content delivery network.

An embodiment of the invention described herein may include a system comprising: (a) a video quality server configured to retrieve device parameter information from a video quality module, wherein the device parameter information is associated with a client device receiving a media stream associated with a piece of media content, wherein the media stream comprises one or more video segments associated with a first version of a plurality of versions of the piece of media content, the first version of the piece of media content being selected for delivery to the client device based upon an amount of bandwidth available for delivery of the media content to the client device; (b) a video quality estimation module configured to generate video quality estimation information for each respective version of the plurality of versions of the piece of media content, the video quality estimation being based at least in part on an encoding bit-rate associated with the respective content version and display parameters associated with the client device, wherein video quality estimation information provides an indication of the video quality of experience for a display of the media content at the client device; (c) wherein the video quality server is further configured to: (i) retrieve video quality estimation information that is generated by the video quality estimation module; and (ii) aggregate the device parameter information and video quality estimation information; and (d) an allocator configured to modify the selection of a version of the piece of media content based upon the aggregated device parameter information and video quality estimation information.

According to an embodiment of the invention, the video quality estimation module is further configured to embed video quality estimation information generated for a segment of a media stream within a manifest file associated with the segment as metadata.

According to an embodiment of the invention, the video quality estimation module is further configured to embed video quality estimation information generated for a segment of a media stream within the segment of the media stream as metadata.

According to an embodiment of the invention, the video quality estimation module is further configured to embed video quality estimation information generated for a segment of a media stream within the media stream as metadata, and the video quality module is configured to extract the embedded video quality estimation information from the media stream and output the extracted video quality estimation information to the video quality server.

According to an embodiment of the invention, the video quality module is integrated with a customer premise equipment device providing one or more services to the client device.

According to an embodiment of the invention, the video quality module is integrated with an access network component providing one or more services to the client device.

According to an embodiment of the invention, the video quality estimation module is further configured to output the video quality estimation information out-of-band to the video quality server.

According to an embodiment of the invention, the allocator is further configured to: (a) modify the selection of a version of the piece of media content to select a second version of the piece of media content, the second version of the piece of media content being associated with a higher bit-rate than a bit-rate associated with the first version of the piece of media content; (b) determine whether enough bandwidth is available to support the delivery of the second version of the piece of media content to the client device; and (c) if the determination is made that there is not enough bandwidth available to support the delivery of the second version of the piece of media content to the client device, increase an allocation of bandwidth to the client device to provide enough bandwidth to support the delivery of the second version of the piece of media content to the client device.

An embodiment of the invention described herein may include a method comprising: (a) retrieving device parameter information associated with a client device receiving a media stream associated with a piece of media content, wherein the media stream comprises one or more video segments associated with a first version of a plurality of versions of the piece of media content, the first version of the piece of media content being selected for delivery to the client device based upon an amount of bandwidth available for delivery of the media content to the client device; (b) retrieving video quality estimation information associated with the media stream being received at the client device, wherein video quality estimation information is generated for each respective version of the plurality of versions of the piece of media content and is based, at least in part on an encoding bit-rate associated with the respective content version and display parameters associated with the client device, and wherein video quality estimation information provides an indication of the video quality of experience for a display of the media content at the client device; (c) aggregating the device parameter information and video quality estimation information; and (d) outputting the aggregated device parameter information and video quality estimation information to a display.

FIG. 1 is a block diagram illustrating an example network environment 100 operable to facilitate an analysis and control of video quality of experience (VQoE) of services delivered to one or more client devices. The network environment 100 may include a content delivery network (CDN) 105, a delivery network 110, and an analytics system 115.

In embodiments, content may be prepared and stored within a CDN 105. Content prepared and stored within the CDN 105 may include multiple-version content such as adaptive bitrate (ABR) content. For example, a single media stream may be received at a transcoder 120, wherein the media stream includes multiple versions of a piece of content. Where the received media stream includes multiple versions of the underlying media (e.g., multiple bitrates, quality, resolution, language, etc.), the transcoder 120 may prepare the media stream for packaging. The media stream may be packaged and encrypted at a packager 125. For example, the packager 125 may separate individual versions of the underlying media from the received media stream.

In embodiments, the individual versions of the underlying media may be stored at an origin server 130. For example, each individual version of the underlying media may be divided into segments, wherein each segment is of a certain duration (e.g., 2-10 seconds) or data size. Each individual segment of each individual version of the media may be identified within a manifest file associated with the media stream.

In embodiments, content may be delivered from the CDN 105 to a requesting client device 135. A client device 135 may output a request for content that is stored at the CDN, and the request may be delivered to the CDN through a delivery network 110. The request may be routed through one or more network elements within the delivery network 110, the network elements including, but not limited to a gateway device 140 (e.g., customer premise equipment (CPE) device providing one or more services to a subscriber premise), a headend device (e.g., cable modem termination system (CMTS) 145), a router 150, and others. The client device 135 may include any device operable to request and receive an ABR content stream. It should be understood that the client device 135 may include any device that is operable to receive media content including, but not limited to a television, computer, tablet, mobile device, set-top box (STB), gaming console, and others.

In embodiments, an analytics system 115 may gather information associated with the services being received at one or more client devices 135 and may analyze the quality of media that is being received at the one or more client devices 135. A video QoE server 155 may estimate the VQoE of video content received at a client device 135. For example, the video QoE server 155 may gather media quality information associated with media received at a client device 135 and may retrieve device parameter information associated with the client device 135 to estimate a VQoE for a media session being received at the client device 135. It should be understood that the video QoE server 155 may consider various parameters or factors associated with a media session (e.g., the specific subscriber receiving the media session, the type of client device 135 receiving the media session, video format associated with the media session, video play-out of the media session, etc.). Further, the delivery of both offline content (e.g., video-on-demand (VoD) content, recorded content, etc.) and real time linear channels may be monitored by the video QoE server 155.

In embodiments, a VQoE system performs a video quality marking (e.g., marking of compressed video segments either offline or real time wire speed) for each video segment. While the associated video is being watched by the subscriber, the VQoE system monitors the consumed video segments. The VQoE system translates the consumed segments to vector of video quality that represents the specific perceived video quality based on the type of the device, the video resolution that is being used and the specific video stream format and encoding.

The information is presented in such a way that an operator can analyze the way the video quality evolved over time per subscriber per video asset.

The monitoring system can create video quality matrix of each video segment, monitor the consumed video by a subscriber and create its own personal video quality matrix that considers the device, the resolution, the video asset and encoding format, and manifest the information to the operator so it is easy to understand what the perceived video quality of experience is like at the consumer end. The system can grow from a passive VQoE system to an active video quality based delivery system that instead of leveling bitrate among subscribers, the VQoE is balanced between all subscribers, thus the system allows optimizing common delivery channel of multiple subscribers and increase total VQoE.

The VQoE server 155 may output VQoE estimates to the video quality statistics database 160. An operator may access VQoE information through the video quality statistics database 160. For example, content can be marked according to the type of content that is being delivered (e.g., broadcast, DVR, VoD, etc.). The video quality statistics database 160 may store video quality information as in-band information (e.g., information associated with each segment of content) or out-of-band information (e.g., information associated with the streaming content).

In some implementations, the system can allocate more bandwidth for high profiles and big screens in order to optimize the overall QoE of the lineup. Thus, the system can apply logic to differentiate bandwidth according to the user device properties. Additionally, the system can differentiate screen size and profile (like SD, HD and 3D).

In other implementations, the system can optimize lineup and session QoE by quality shaping. The system can aim for a uniform quality over time and across sessions. This allows increasing the quality and saving bandwidth relative to other adaptive streaming solutions. For example, the system, method and computer readable medium avoids areas where the video quality is bad by selection of high quality and bit rate versions. The system may compensate for the extra bandwidth in other areas or sessions where the actual quality of the lower version is good enough.

The system can also facilitate increased density by optimizing QoE in the user devices and network resource utilization of the devices. Thus, the system facilitates an increased number of user devices being served over a given network.

In some implementations, the system can optimize the QoE given an inconsistent QoS in the home network. For example, the system can reduce the user device's tuning delay (start latency) by providing more bandwidth to new user devices and a smart version selection.

In embodiments, a video quality module (e.g., VQoE agent 165) may generate a video quality estimation associated with media being received at a client device 135. In embodiments, VQoE may be estimated based on an identification of a specific client device receiving the content, identification of the specific media session, identification of the segment variants being served, and other information. Information collected for a VQoE determination may include, but is not limited to, subscriber information, device information, name of the asset, start time of the content, asset duration, and others. This information may be collected when a client device outputs a request for a piece of content. Collected information associated with specific content segments may include, but is not limited to, segment identifier, start time of the segment, duration of the segment, bitrate, video quality score, type of content (e.g., 4K, HD, SD, etc.), resolution, and others. A video quality estimation may be based on non-reference Q-scale analysis.

It should be understood that a VQoE agent 165 may be located at any one or more of a variety of locations within the network environment 100. Various alternative locations for the VQoE agent 165 are shown in FIG. 1. For example, a VQoE agent 165 may be located at an origin server 130, a client device 135, a gateway 140, a CMTS 145, or a router 150.

In embodiments, a VQoE agent 165 may reside within a CDN 105 (e.g., at a transcoder 120, as a stand-alone module, at a packager 125, or at an origin server). The VQoE agent 165 may perform video quality estimation prior to an encryption of the video stream. The packager 125 may reside prior to the origin server 130 or after the origin server 130 as a just-in-time (JIT) packager. A transcoder 120 may work with a packager 125 to apply video quality information to specific content. A transcoder 120 and packager 125 may operate to count and score video quality and MD.

A VQoE agent 165 located within the CDN 105 may report video quality information associated with the content back to the VQoE server 155. Video quality information may be reported to the VQoE server 155 through a JIT packager (not shown). In embodiments, the VQoE agent 165 may intercept a video session coming from a local network (e.g., home network) and may supply server session and segment information to the VQoE server 155.

In embodiments, one or more network components within the delivery network 110 may include a VQoE agent 165 operable to communicate video quality information back to a VQoE server 155. For example, a VQoE agent 165 may be located within a client device 135, a gateway 140, a headend device (e.g., CMTS 145), a router 150, and any other network element.

In embodiments, a VQoE agent 165 may exist in a gateway 140 and may intercept video session information received from one or more devices in a local network associated with the gateway 140 (e.g., information received from a client device 135 such as a tablet, mobile device, etc.). The VQoE agent 165 may then output gathered information (e.g., device parameters, location, video metadata, download statistics, etc.) to the VQoE server 155.

In embodiments, a VQoE agent 165 may reside within a headend device such as a CMTS 145. Video may be delivered to a client device 135 over a dynamic service flow. A CMTS 145 may implement deep packet inspection (DPI) identifying requests (e.g., HTTP Get requests) on the video DSF and mirror the results of the DPI to the VQoE server 155. DPI inspection may be performed by a device or module that is external to the CMTS 145 (e.g., a DPI module (not shown)). The DPI device or module may identify video HTTP get requests and mirror the requests to the video QoE server 155.

In embodiments, a VQoE agent 165 may output video quality information to a VQoE server 155 using HTTP get requests.

In embodiments, the VQoE server 155 may communicate directly with a VQoE agent 165 residing at the gateway 140 or client device 135 receiving video content. For example, the VQoE agent 165 may supply server session and segment information to the VQoE server 155. The VQoE server 155 may aggregate the information and push the aggregated information to a database (e.g., video quality statistics database 160).

In embodiments, a VQoE agent 165 residing at the gateway 140 or client device 135 may supply session information and segment identity to the VQoE server 155, and the VQoE server 155 may access segment information from the CDN 105 through video quality metadata according to the asset name. The VQoE server 155 may then aggregate the retrieved information and push the aggregated information to the video quality statistics database 160.

In embodiments, the analytics system 115 may include an ABR server that is configured to deliver media content using HTTP (e.g., HTTP live streaming (HLS)).

In embodiments, video quality information and statistics retrieved by the VQoE server 155 may be stored at the video quality statistics database 160. The analytics system 115 may be configured to output one or more views of the database to a display (e.g., web graphical user interface (GUI) application). For example, the Web GUI application may use HTML and Java script code used for viewing the MAS statistics.

It should be understood that other information may be gathered from the video session such as advertisement insertion information (e.g., advertisement viewership information, missed and viewed advertisements, subscriber geographical information, demographic profile, target device used to view the advertisement, etc.). Video quality information may be associated with the user experience (e.g., channel changes, trick play, cache miss/hit, etc.).

The VQoE server 155 may then modify ABR client decision based on a fair share policy. For example, the VQoE server 155 may allocate a total available bandwidth amongst multiple client devices, wherein each client device is allocated a portion of the available bandwidth that is sufficient for receiving a video stream having the same quality level as that experienced by the other client devices. Thus, bandwidth is allocated to support equal video quality levels at different devices.

In embodiments, the video quality of a media session received at a client device 135 may be measured as a weighted average of quality grades given to groups of pictures (GOPs). For example, an average received video quality may be determined by taking the average of the video quality of GOPs received at the client device 135 over a certain period of time. Quality grades may be given to GOPs using the various video quality estimation techniques described herein.

In embodiments, VQoE of a media session received at a client device 135 may be dependent on a variety of factors. For example, changes in video quality caused by a switch between video versions with significantly different average video quality may cause visible artifacts during playback of the associated media, thus degrading the VQoE of the media session. Further, constant playback starting and stopping may lead to VQoE degradation. For example, playback of the media may be stopped when a media playback buffer is starved and then playback may be resumed when the media playback buffer is refilled to a sufficient level. The VQoE at a client device 135 may also be impacted by the amount of time between a start/seek request and corresponding playback commencement.

In embodiments, VQoE information stored at the video quality statistics database 160 may be accessed upon receiving notice of a possible service impairment (e.g., a customer complaint), and the information may be used to estimate the VQoE being received by an affected client device 135. The information may also be used to proactively monitor VQoE and alarm an operator of video quality degradation at a client device 135. The information may also be used to analyze the root cause of VQoE degradation and propose a solution.

In embodiments, an allocator may modify an ABR session based on video quality information that is received. Potential problems that are addressed by the allocator may include fluctuations in bandwidth availability, variability of video bit rate over time, and variability of video quality over time. The allocator may control version selection (e.g., choosing between video versions that are sent to a client device 135, that differ in bit rate and quality) and statistical multiplexing (e.g., the act of dividing the available bandwidth of a shared link among several client devices by allocating variable transmission bit rates to each client device). The allocator may make allocation decisions based upon metadata compiled by a quality measurement module (e.g., VQoE agent 165), and the metadata may be acquired by the allocator according to any of a variety of methods. If content is encrypted, then the content may undergo partial decryption to retrieve in-band metadata. It should be understood that the allocator may reside at various locations within the CDN 105, delivery network 110, or analytics system 115. For example, the allocator may be located at a component of the delivery network 110 (e.g., client device 135, gateway 140, CMTS 145, router 150, etc.) or at the VQoE server 155.

A VQoE agent 165 may be located upstream from a subscriber premise (e.g., at the origin server 130) or may be located at a device within the subscriber premise (e.g., gateway 140). When the VQoE agent 165 is located upstream from the subscriber premise, the VQoE agent 165 may operate to control bitrate by controlling down-stream responses. When the VQoE agent 165 is located within the subscriber premise, bit rate control may be applied by controlling the up-stream requests.

In embodiments, an allocator may base allocation decisions on information associated with a media session being received at a client device 135 and information associated with network resources available for the delivery of the media session. For example, the allocator may use video quality (e.g., video quality measurements performed on a video input) and size metrics, future transmission simulations, network information, user information, and/or client device 135 playback buffer information.

In embodiments, the allocator may have access to data that resides at a client device 135 as well as data that resides at other components of the network environment 100 (e.g., CDN 105, analytics system 115, etc.). This data may be used to simulate future transmissions to the client device 135, and to react to changing input conditions (e.g., increase in segment size) before the change is realized by the user.

In embodiments, the allocator may gather network information to determine link capacity that is available for delivery of a media session to a client device 135. Information associated with network topology and resources may be available to the allocator via one or more of a variety of methods. For example, the allocator may receive a configuration from a separate configuration entity. This configuration may include the network topology and available bandwidths per home router and per channel. The bandwidths published to the allocator through this method may be upper bounds or tight. As another example, the allocator may receive network information from output handling. This information may include bandwidth available to specific user devices that reside behind a home router, bandwidth available to a home router, and bandwidth available that is shared between many home routers. The method with which this information may be gathered includes, but is not limited to, the following: transmission control protocol (TCP) congestion control feedback; an in-line system wherein all traffic in the system passes through the output handling; a calculation based on one or more queries of network entities such as routers using existing protocols (e.g., simple network management protocol (SNMP)).

In embodiments, the allocator may base allocation decisions on the status and transmission being made to a plurality of subscribers and subscriber devices sharing network resources. The allocator may use information associated with the plurality of subscribers sharing network resources to manage cross-effects between the subscribers. For example, as one or more subscriber devices join or leave the network or when network resource demand at one or more subscriber devices changes, the allocator may adjust the bit-rate allocated to certain subscriber devices (e.g., client device 135).

In embodiments, the allocator may monitor data transmissions to a client device 135 to determine a status of a media playback buffer associated with the client device 135. When media segments are received at the client device 135, they are not sent to playback instantly, but rather are stored in a buffer at the client device 135 until they are removed from the buffer for playback. The state of a media playback buffer of a client device 135 can assist the allocator in making allocation decisions.

It should be understood that various methods may be used by the allocator to determine or estimate the state of a playback buffer of a client device 135. The allocator may receive an indication of a media playback buffer state from a client device 135, or the allocator may estimate the current state of the media playback buffer. For example, the determination of a playback buffer state may be based on the rate of data transmission to a client device 135, the size of each media segment delivered to the client device 135, and the playback duration of each segment. Suppose a client device 135 receives video segments via a channel of 2 Mbps, each video segment is of size 1 Mbit, and playback duration of each video segment is 1 second. According to this example scenario, a new segment enters the media playback buffer every 0.5 s (e.g., at times: 0.5 s, 1 s, 1.5 s, 2 s, and so on). The client device 135 commences playback when the first segment is received. Each second, one segment is removed from the media playback buffer for playback (e.g., at times: 0.5 s, 1.5 s, 2.5 s, and so on). After 5 seconds of transmission, 10 segments have entered the media playback buffer and 4 have been removed, thus the allocator can make the determination that 6 segments, or 6 seconds of playback, have accumulated in the media playback buffer.

As another example, the current state of media playback buffer at a client device 135 may be based on a current playback position and/or a playback start time. The allocator may identify a current position in playback of media at a client device 135 from within a request received from the client device 135 (e.g., HTTP Get request). From this information, the current playback buffer position may be equivalent to the difference between the amount of data transmitted to the client device 135 and the amount of data removed for playback during the time period between the playback start time and a current time. The playback start time may be the time at which a first segment of media is received by the client device 135, or may be experimentally determined for each client device type. A skip or seek request may be identified by a discontinuity in the request. Delayed client device request times (i.e., requests arrive later than expected) may indicate that an associated playback buffer is full or that the user has paused playback of the media.

In embodiments, the allocator may be configured to enforce policies that are established for specific client devices 135. The allocator may receive device parameter information associated with a specific client device 125. Device parameter information may include, for example, type of client device (e.g., tablet, mobile device, television, computer, etc.), display capabilities (e.g., screen size, bandwidth, codec, etc.), and others. Policies for making allocation decisions based upon device parameter information may be configured by an operator or a subscriber, and the policies may include, but are not limited to the following: minimum/maximum/bias video quality level per client device; minimum/maximum/bias transmission rate per client device; service delivery complying with priorities assigned to client devices (e.g., client devices with higher priority may receive more resources than lower priority client devices in cases of network resource saturation).

In embodiments, the allocator may enforce global policies according to the availability of network resources. For example, the allocator may reject new session requests when network resources are low and the QoE of current sessions may be jeopardized by additional sessions. It should be understood that the allocator may have access to information associated with the network and client devices 135 served by the allocator.

Figure 2:
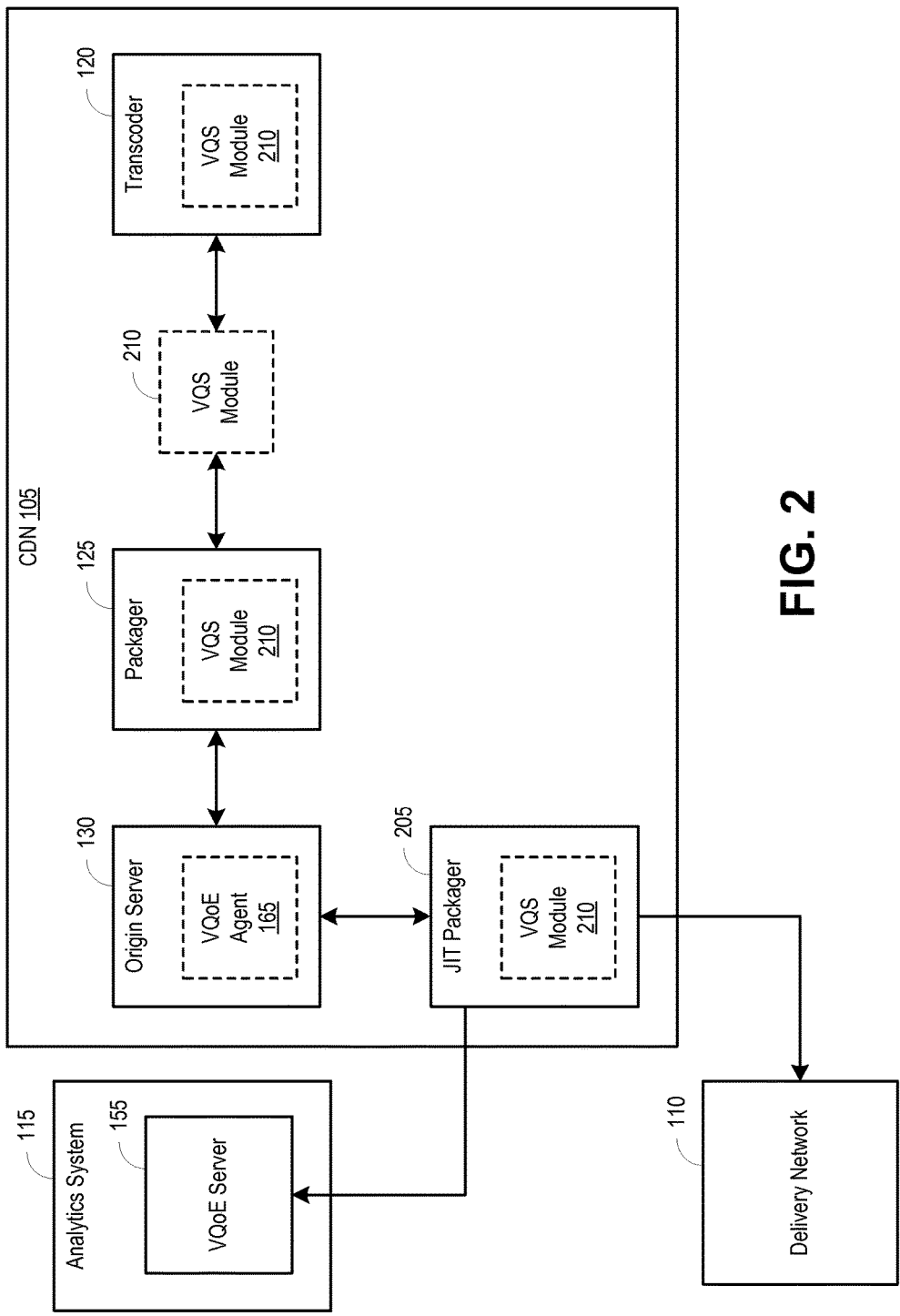
FIG. 2 is a block diagram illustrating an example content delivery network operable to estimate the video quality of a media session that is being delivered to a client device.

FIG. 2 is a block diagram illustrating an example content delivery network 105 operable to estimate the video quality of a media session that is being delivered to a client device. The content delivery network (CDN) 105 may include a transcoder 120, a packager 125, and an origin server 130. In embodiments, the CDN 105 may further include a just-in-time (JIT) packager 205. A JIT packager 205 may encrypt and package a variant media stream that is selected for delivery to a client device (e.g., client device 135 of FIG. 1).

In embodiments, a multi-version video stream may be output from the transcoder 120 to the packager 125. The packager 125 may encrypt the multi-version video stream and may output the encrypted stream to the origin server 130. The multi-version video stream may be stored within the origin server 130 as a plurality of variant video streams, wherein each variant video stream represents a single version of the video stream (e.g., specific resolution, bit-rate, codec, etc.).

In embodiments, a video quality estimation (VQS) module 210 may perform video quality estimation on the multi-version video stream before the video stream is encrypted. For example, a VQS module 210 may be located at a transcoder 120, a packager 125, or as a standalone module within the CDN 105. The video quality information that is retrieved during the video quality estimation may be included in the encrypted video stream within manifest files associated with various segments of the stream, or may be included in the encrypted video stream as metadata embedded within individual media segments. In embodiments, a VQS module 210 may upload the video quality information directly to the origin server 130 (e.g., out-of-band delivery to the origin server 130). As an example, video quality information may be embedded as metadata within the multi-version video stream by the transcoder 120 or by a standalone VQS module 210. The packager 125 may then identify the video quality information and pass the information onto the origin server 130 by embedding the information within the encrypted media stream or by uploading the information directly to the origin server 130.

In embodiments, video quality estimation may be performed on a media stream after the media stream has been encrypted. For example, the VQS module 210 may reside within a JIT packager 205, and the VQS module 210 may perform video quality estimation and add video quality estimation information to the media stream as metadata before outputting the media stream to a delivery network 110.

In embodiments, the video quality estimation may include a calculation of video quality performed over a specified period of time or specified number of video frames. The period of time may be variable or constant and may depend on operator or user configuration, group of picture (GOP) structure, segment length, and/or length of content associated with the media stream.

In embodiments, video quality estimation may be applied using a switch unit as the basic block for quality measurement. A switch unit is the smallest unit of media that may be seamlessly concatenated between different versions or can be processed to do so. For example, each synchronized closed GOP is a switch unit. During the processes of media version selection and bit-rate allocation, this atomic switch unit may be used as a media version segment (i.e., media variants may be divided into switch units rather than longer segments that are based on a certain duration of the underlying content), thus increasing granularity, which in turn results in improved efficiency.

In embodiments, a higher quality video version or the source video may be used by the VQS module 210 as a reference for video quality estimation. If a quality version of the media is not available, the video quality estimation may be based on a non-reference model whereby the video quality is estimated without using a reference. For example, the video quality calculation may be optimized for increased correlation with subjective video impression (such as mean opinion score (MOS)). The video quality estimation may be calculated using mean square error, peak signal to noise ratio (PSNR), structural similarity or any other metric for the reference or non-reference model.

In embodiments, the input for the video quality estimation may be provided to a VQS module 210 in either real-time or offline. For offline processing, more tools can be available to offer better correlation to the subjective quality.

A VQS module 210 may operate in various modes to perform a video quality estimation on a media stream segment. For example, the VQS module 210 may operate in an uncompressed mode wherein video quality estimation is performed on a media segment that has been decoded, or the VQS module 210 may operate in a compressed mode wherein video quality estimation is performed on a media segment that remains encoded. The uncompressed mode may offer a better correlation to the subjective video quality, whereas the compressed mode may provide higher density and lower costs by avoiding the decoding of an encoded media stream.

When a VQS module 210 performs video quality estimation on encoded media segments (e.g., while in a compressed mode), the video quality estimation may be based on parameters such as qscale value, motion vector, coefficients, and others. It should be understood that the parameters used for performing video quality estimation in a compressed mode may depend and may vary based on the codec associated with the media stream (e.g., H.264, MPEG2, VLC, etc.). For example, different codecs may use different parameters in the encoded domain. In embodiments, video quality estimation may be calculated based on encoding parameters such as average bit rate, resolution, and others. A video quality estimation based on encoded information may be used to make allocation decisions based on such factors as resolution and screen size. For example, the video quality estimation information may allow for screen and profile differentiation (e.g., small screens may receive a proportional share of the bandwidth). While operating in the compressed mode, the VQS module 210 may perform video quality estimation on metadata and/or manifest files, thus the VQS module 210 may estimate video quality without processing the media stream. Moreover, in instances where the input is encoded with constant quality, video quality differentiation may be maintained.

It should be understood that a VQS module 210 may perform video quality estimation according to a hybrid mode wherein some content is measured in the compressed domain and some content is measured in the uncompressed domain. In embodiments, video quality estimation may be performed without processing the media stream. For example, video quality estimation may be based on performance and viewing statistics.

In embodiments, the VQS module 210 may normalize a video quality estimation based upon a profile of a device. For example, a grade associated with the estimated video quality may be normalized based upon client device profile parameters such as resolution or content type (e.g., standard definition (SD), high-definition (HD), 3D content, etc.), relative screen size (e.g., screen size associated with a device type such as a mobile device, tablet, television, etc.), and others.

The following method, peak signal to noise ratio (PSNR) normalization, provides one example for estimating video quality from compressed video input (e.g., H.264) according to an embodiment of the invention. The method may operate to estimate video quality using compressed video parameters and/or edge device specifications. According to the PSNR normalization method, video quality may be estimated without decoding the compressed stream and without using a reference stream. Video quality estimation by way of PSNR normalization may be a two stage process.

PSNR normalization may begin by estimating the peak signal to noise ratio (PSNR) of a group of pictures. PSNR may be estimated from the compressed domain. The PSNR estimation may be based on quantization parameters (QP) and may introduce linear complexity in its basic form which provides an estimated PSNR (see equation 1). The PSNR estimator can be further refined or upgraded to detect other effects (e.g., pumping effect). PSNR estimation may be independent from an encoder, edge device and/or bit-rate. The term E[QP OF GROUP OF IMAGES] denotes the average QP over a certain video segment that includes the group of images.

$$PSNR = \alpha_1 \cdot E[QP \text{ of a group of images}] + \beta_1 \quad \text{(equation 1)}$$

Next, spatial pixel density may be calculated. Spatial pixel density refers to the pixel density for 1 degree of viewing angle. In contrast to the PSNR estimation, the spatial pixel density may be affected by one or more edge device characteristics (e.g., display size and native resolution, displayed stream resolution, viewing distance and human eye discrimination ability, etc.). There may also be additional parameters which affect the video quality such as the edge device quality (e.g., black-levels, color temperatures, brightness, dynamic range, contrast, color, viewing angles, etc.). It may be assumed that the displayed stream is scaled up/down to fit the edge device display size and resolution while maintaining its original aspect ratio.

Video quality may be estimated using the calculated PSNR and spatial pixel density. For example, using PSNR and angular pixel density, video quality may be estimated according to equation 2. In embodiments, the video quality for new edge devices with new native resolutions and display sizes may be interpolated using previously determined video qualities.

$$VQ = \alpha_2 \cdot PSNR + \beta_2 \cdot \text{angular pixel density} + \gamma_2 \quad \text{(eq. 2)}$$

As described in the following equations, edge device information may include diagonal (screen length), nHres, nVres (native resolution), AR (aspect ratio), dist (viewing distance) and displayed screen information may include sHres and sVres (resolution).

In embodiments, display dimensions may be extracted, and extracting display dimensions may be accomplished according to the following equations:

$$dVsize^2 + dHsize^2 = diag^2$$

$$dVsize = dHsize \cdot AR$$

$$dVsize = diag \frac{1}{\sqrt{1+AR^2}}$$

$$dHsize = diag \frac{AR}{\sqrt{1+AR^2}}$$

Pixel radius may be extracted, and extracting pixel radius may be accomplished according to the following equations:

$$Vres = \min(nVres, sVres)$$

$$Hres = \min(nHres, sHres)$$

$$PixelArea = \frac{dVsize}{Vres} \cdot \frac{dHsize}{Hres}$$

$$PixelRadius = \sqrt{\frac{PixelArea}{\pi}}$$

Angular pixel density may be extracted, and extracting angular pixel density may be accomplished according to the following equations:

$$PixelViewingAngle = tg^{-1}\left(\frac{PixelRadius}{dist}\right)$$

$$AngularPixelDensity = \frac{1}{PixelViewingAngle}$$

In embodiments, profile and screen normalization may be separated or unified. Separated profile and screen normalization may measure video quality independently for a profile and a screen. Unified profile and screen normalization may be accomplished by normalizing raw video quality and the user device type into a normalized video quality value. Unified profile and screen normalization may be advantageous when multiple profiles are served by a stream because the raw video quality measurement is performed for a single instance.

In embodiments, video quality may be estimated before or after a media stream is encrypted (e.g., digital rights management (DRM) encryption). Where video quality is measured prior to encryption (e.g., at a transcoder, packager, or separate video quality module), the media stream may be encrypted following the quality measurement. It should be understood that encryption of the media stream may be performed at the same machine or at a different machine than the quality measurement. Where encryption of a media stream takes place prior to a video quality measurement, decryption keys may be used to decrypt the data, metadata may be retrieved, and the data stream may be re-encrypted. Where encryption of a media stream takes place prior to a video quality measurement, and decryption of the stream is not practical, the video quality measurements may be based upon parameters that are not affected by the encryption of the stream. For example, an average video quality estimation of a media stream may be obtained from an interpolation using recommended bit-rate values for encoding streams associated with specific device types and a desired video quality level, wherein it may be assumed that video quality complies with public recommended encoding settings for ABR streaming of media (e.g., HTTP live streaming (HLS)).

Metadata may be delivered to and complied at an allocator, wherein the metadata includes information used for proper media version selection and statistical multiplexing. Delivery of the metadata to the allocator is provided in cases where the system is deployed in a distributed architecture (e.g., where the quality measurement module does not reside in the same place as the allocator). It should be understood that various delivery methods may be used for delivering metadata from the quality measurement module (e.g., VQS module 210) to the allocator (e.g., VQoE server 155).

According to one delivery method, the metadata may be embedded into the content using mechanisms offered by the container format. For example, when media content is encapsulated in MPEG-Transport-Stream, metadata may be embedded as transport_private_data within the adaptation field. Unlike traditional single program transport stream (SPTS) encryption, some encryption protocols encrypt all the data as a file (e.g., using cipher block chaining (CBC)). In this case, the metadata may be inserted at the beginning of the file such that metadata is available by decryption of a small portion of the segment.

According to another delivery method, the metadata may be added into the manifest files associated with the media stream. For example, within HLS, metadata may be added to the .m3u8 playlists using the '#' comment syntax which would be ignored by entities other than the allocator.

According to another delivery method, new segments may be interleaved into the existing playlist of a single variant containing only metadata.

According to another delivery method, a new variant of the stream can be added that contains segments containing only metadata.

According to another delivery method, live content metadata can be sent over an out of band connection from the quality measurement module (e.g., VQS module 210) to the allocator (e.g., VQoE server 155).

Figure 3:
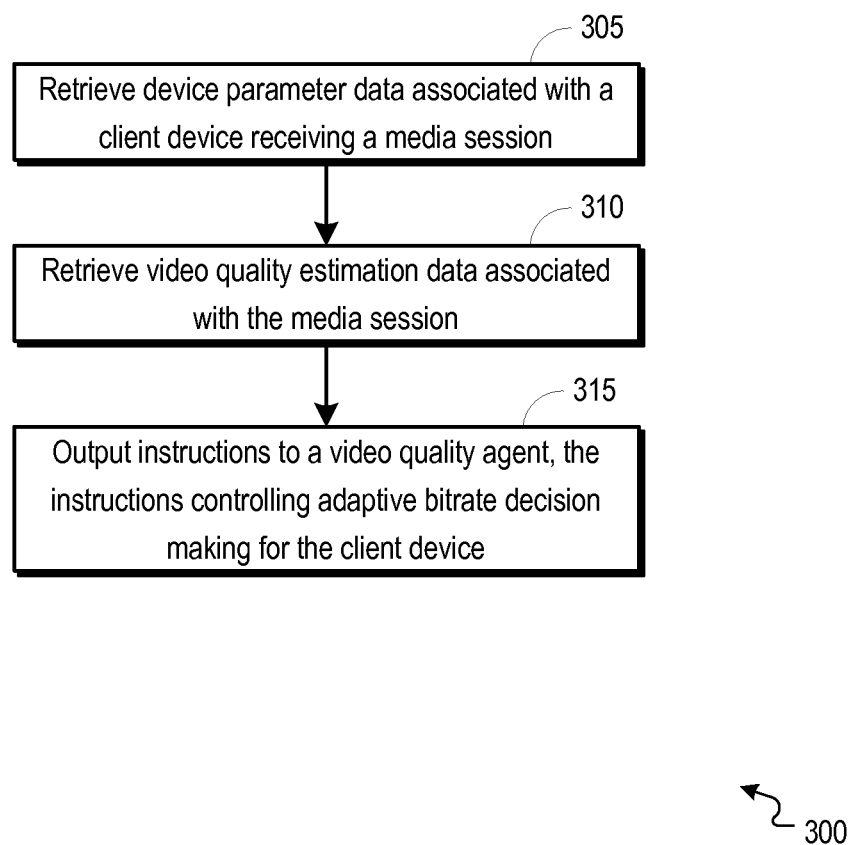
FIG. 3 is a flowchart illustrating an example process operable to control adaptive bitrate decision making based on an estimated video quality associated with a media session being received by a client device.

FIG. 3 is a flowchart illustrating an example process 300 operable to control adaptive bitrate decision making based on an estimated video quality associated with a media session being received by a client device. The process 300 may start at 305 where device parameter data associated with a client device receiving a media session is retrieved. Device parameter data may be retrieved from a client device (e.g., client device 135 of FIG. 1) by a video quality server (e.g., VQoE server 155 of FIG. 1). Device parameter data may include information such as client device type, supported resolution and/or encoding bit-rate, screen size/dimensions, and various other information associated with the client device 135.

At 310, video quality estimation data associated with the media session may be retrieved. Video quality estimation data may be retrieved, for example, by the VQoE server 155. Video quality estimation data associated with the media session may be retrieved from a variety of sources including, but not limited to the client device receiving the media session (e.g., client device 135), a CPE device (e.g., gateway 140 of FIG. 1) associated with the client device receiving the media session, a network device (e.g., router 150 of FIG. 1, headend device such as a CMTS 145 of FIG. 1, etc.) serving the client device receiving the media session, a CDN 105 of FIG. 1 delivering the media session to the client device, and others. In embodiments, video quality estimation data may be aggregated with device parameter data associated with the client device, and the aggregated data may be stored at the VQoE server 155 or at another server (e.g., video quality statistics database 160 of FIG. 1).

At 315, instructions may be output to a video quality agent, wherein the instructions control adaptive bitrate decision making for delivery of the media session to the client device. In embodiments, the VQoE server 155 may include an allocator which may allocate available bandwidth amongst one or more devices based on the device parameters and video quality estimation data. For example, the allocator may adjust which version of a piece of content is delivered to a client device based on a quality level associated with the content version and an intended level of quality to be delivered to the client device. Selection of a content version for each of a plurality of devices may be based on an attempt to deliver content of the same level of quality to each of the plurality of devices.

Figure 4:
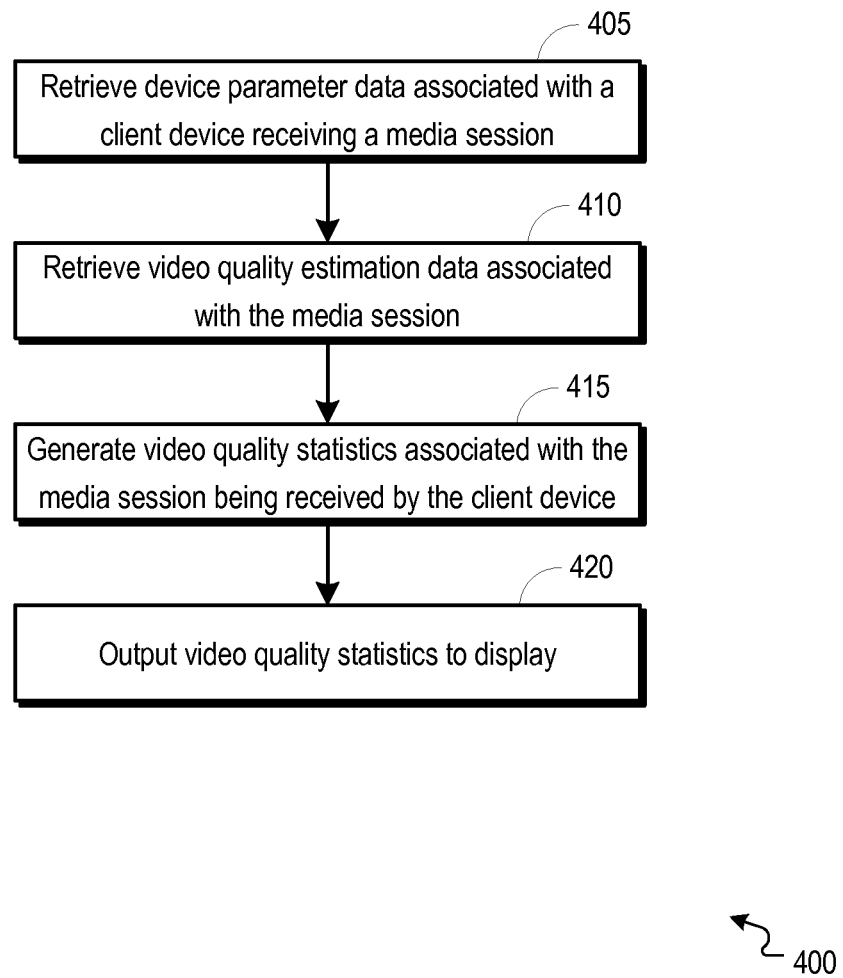
FIG. 4 is a flowchart illustrating an example process operable to facilitate the output of video quality statistics associated with a media session being received by a client device.

FIG. 4 is a flowchart illustrating an example process 400 operable to facilitate the output of video quality statistics associated with a media session being received by a client device. The process 400 may start at 405 where device parameter data associated with a client device receiving a media session is retrieved. Device parameter data may be retrieved from a client device (e.g., client device 135 of FIG. 1) by a video quality server (e.g., VQoE server 155 of FIG. 1).

At 410, video quality estimation data associated with the media session may be retrieved. Video quality estimation data may be retrieved, for example, by the VQoE server 155. Video quality estimation data associated with the media session may be retrieved from a variety of sources including, but not limited to the client device (e.g., client device 135) receiving the media session, a CPE device (e.g., gateway 140 of FIG. 1) associated with the client device receiving the media session, a network device (e.g., router 150 of FIG. 1, headend device such as a CMTS 145 of FIG. 1, etc.) serving the client device receiving the media session, a CDN 105 of FIG. 1 delivering the media session to the client device, and others. In embodiments, video quality estimation data may be aggregated with device parameter data associated with the client device, and the aggregated data may be stored at the VQoE server 155 or at another server (e.g., video quality statistics database 160 of FIG. 1).

At 415, video quality statistics associated with the media session being received by the client device may be generated. Video quality statistics may be generated, for example, by the VQoE server 155 and may be based upon device parameter data and video quality estimation data associated with the client device receiving the media session. In embodiments, video quality statistics may provide an indication of the quality of experience for the media session as observed by a user viewing the media session at the client device. For example, the video quality statistics may include a score indicating the video quality of experience at the client device.

At 420, video quality statistics may be output to a display. In embodiments, video quality statistics may be output to a display and displayed within a user interface, wherein the display may provide a viewer with an indication of the video quality of experience for one or more media sessions as observed at one or more client devices. For example, video quality statistics may be displayed for a plurality of media sessions being delivered to one or more client devices.

The video quality statistics database 160 may create video quality matrix of each video segment, monitor the consumed video by a subscriber and create a video quality matrix for each device that considers the device, the resolution, the video asset and encoding format, and manifest the information to the operator so it is easy to understand what the perceived video quality of experience is like at the consumer end.

The video quality statistics database 160 may translate the consumed segments to video quality vectors that represent the specific perceived video quality based on the type of the device, the video resolution that is being used, and the specific video stream format and encoding. The information may be presented in such a way that an operator can analyze the way the video quality evolves over time per subscriber per video asset.

Figure 5:
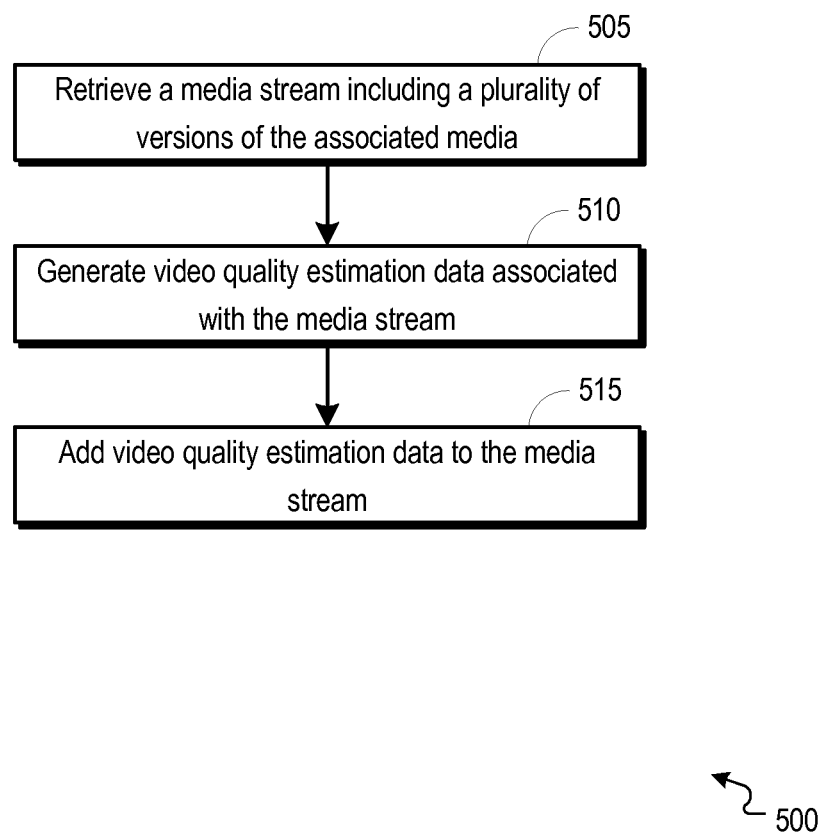
FIG. 5 is a flowchart illustrating an example process operable to facilitate the addition of video quality estimation data to a media stream.

FIG. 5 is a flowchart illustrating an example process 500 operable to facilitate the addition of video quality estimation data to a media stream. The process 500 may start at 505 when a media stream is retrieved, wherein the media stream includes a plurality of versions of the associated media. The media stream may be received at a content packaging and/or delivery system (e.g., CDN 105 of FIG. 1). In embodiments, the media stream may include a manifest file and one or more video segments associated with a particular version of the media.

At 510, video quality estimation data associated with the media stream may be generated. Video quality estimation may be performed on a media stream by one or more various components of the content packaging and/or delivery system (e.g., CDN 105). For example, video quality estimation may be performed on the media stream by a packager (e.g., packager 125 of FIG. 1) before the media stream is encrypted. In embodiments, video quality estimation may be performed on the media stream before the media stream reaches a packager 125. For example, video quality estimation may be performed on the media stream by a transcoder (e.g., transcoder 120 of FIG. 1) or by a separate video quality estimation module (e.g., VQS module 210 of FIG. 2).

Information collected for estimation of video quality may include, but is not limited to, subscriber information, device information, name of the asset, start time of the content, asset duration, and others. This information may be collected upon the content request being received by the client device. Collected information associated with specific content segments may include, but is not limited to, segment identifier, start time of the segment, duration of the segment, bitrate, video quality score, type of content (e.g., 4K, HD, SD, etc.), resolution, and others.

A video quality estimation (VQS) may be based on non-reference Q-scale analysis. VQS may be performed by a VQS module 210 which may be located at the transcoder 120, may be a stand-alone module, or may reside at the packager 125. VQS may be performed prior to encryption. The packager 125 may reside prior to the origin server 130 of FIG. 1 or after the origin server 130 as a JIT packager 205 of FIG. 2. Video quality information may be stored in an in-band manifest file, an in-band segment, or an out-of-band database.

At 515, video quality estimation data may be added to the media stream. In embodiments, video quality estimation data may be added to the media stream as metadata, and the media stream, including the video quality estimation data, may be output to and stored at an origin server (e.g., origin server 130). Video quality estimation data may be added to the media stream as metadata that is added to a manifest file associated with a plurality of media versions or metadata that is added to one or more media segments that are associated with a single version of the media. In embodiments, video quality estimation data may be added to the media stream before the media stream reaches a packager (e.g., packager 125). For example, video quality estimation data may be added to a media stream by a transcoder (e.g., transcoder 120) as metadata embedded in the media stream.

Figure 6:
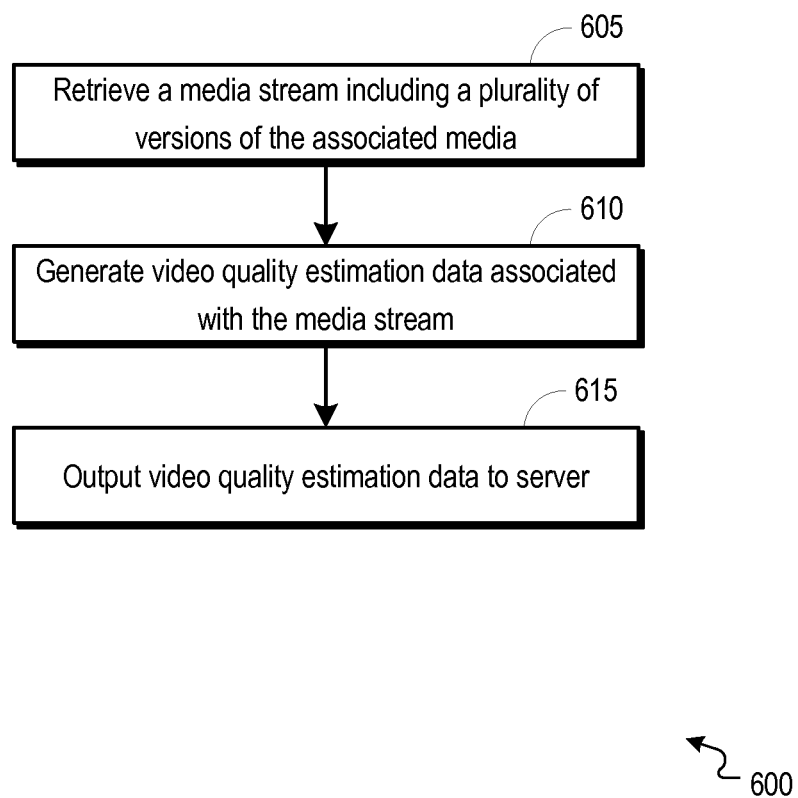
FIG. 6 is a flowchart illustrating an example process operable to facilitate the output of video quality estimation data to an origin server.

FIG. 6 is a flowchart illustrating an example process 600 operable to facilitate the output of video quality estimation data to an origin server. The process 600 may start at 605 when a media stream is retrieved, wherein the media stream includes a plurality of versions of the associated media. The media stream may be received at a content packaging and/or delivery system (e.g., CDN 105 of FIG. 1). In embodiments, the media stream may include a manifest file and one or more video segments associated with a particular version of the media.

At 610, video quality estimation data associated with the media stream may be generated. Video quality estimation may be performed on a media stream by one or more various components of the content packaging and/or delivery system (e.g., CDN 105). For example, video quality estimation may be performed on the media stream by a packager (e.g., packager 125 of FIG. 1) before the media stream is encrypted.

Information collected for estimation of video quality may include, but is not limited to, subscriber information, device information, name of the asset, start time of the content, asset duration, etc. This information may be collected upon the content request being received by the client device. Collected information associated with specific content segments may include, but is not limited to, segment identifier, start time of the segment, duration of the segment, bitrate, video quality score, type of content (e.g., 4K, HD, SD, etc.), resolution, and others.

A video quality estimation (VQS) may be based on non-reference Q-scale analysis. VQS may be performed by a VQS module 210 of FIG. 2 which may be located at the transcoder 120, may be a stand-alone module, or may reside at the packager 125. VQS may be performed prior to encryption. The packager 125 may reside prior to an origin server 130 of FIG. 1 or after the origin server 130 as a JIT packager 205. Video quality information may be stored in an in-band manifest file, an in-band segment, or an out-of-band database.

At 615, video quality estimation data may be output to an origin server (e.g., origin server 130) or a video quality server existing outside of the CDN 105 (e.g., VQoE server 155 of FIG. 1). In embodiments, video quality estimation data may be delivered to an origin server 130 or VQoE server 155 out-of-band. For example, the video quality estimation data may be uploaded to a server separately from the associated media stream.

Figure 7:
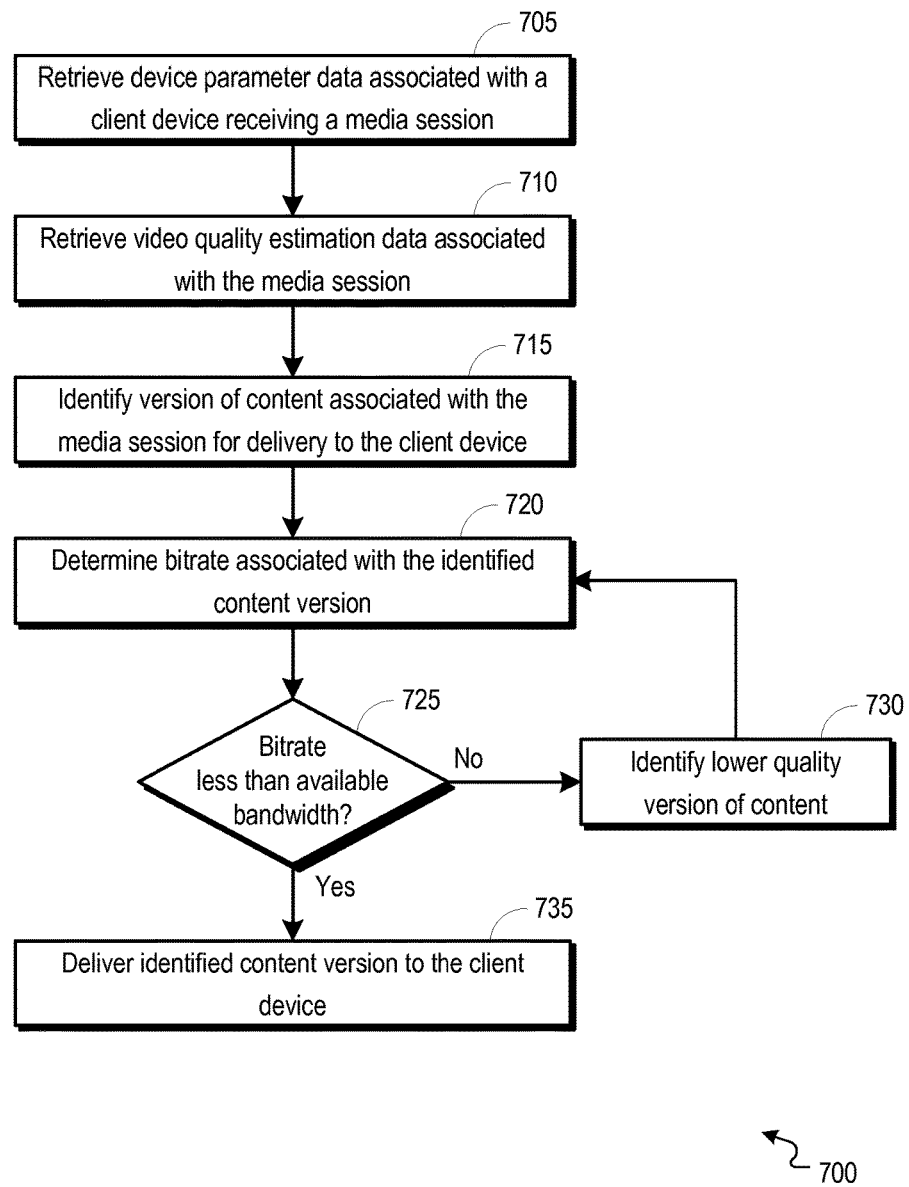
FIG. 7 is a flowchart illustrating an example process operable to identify content versions for delivery to a client device based on an estimated video quality associated with the media session being received by the client device.

FIG. 7 is a flowchart illustrating an example process 700 operable to identify content versions for delivery to a client device based on an estimated video quality associated with the media session being received by the client device. The process 700 may start at 705 where device parameter data associated with a client device receiving a media session is retrieved. Device parameter data may be retrieved from a client device (e.g., client device 135 of FIG. 1) by a video quality server (e.g., VQoE server 155 of FIG. 1).

At 710, video quality estimation data associated with the media session may be retrieved. Video quality estimation data may be retrieved, for example, by the VQoE server 155. Video quality estimation data associated with the media session may be retrieved from a variety of sources including, but not limited to the client device (e.g., client device 135) receiving the media session, a CPE device (e.g., gateway 140 of FIG. 1) associated with the client device receiving the media session, a network device (e.g., router 150 of FIG. 1, headend device such as a CMTS 145 of FIG. 1, etc.) serving the client device receiving the media session, a CDN 105 of FIG. 1 delivering the media session to the client device, and others. In embodiments, video quality estimation data may be aggregated with device parameter data associated with the client device, and the aggregated data may be stored at the VQoE server or at another server (e.g., video quality statistics database 160 of FIG. 1).

At 715, a version of the content associated with the media session may be identified based upon device parameter data associated with the client device. In embodiments, the video quality server (e.g., VQoE server 155) may determine an optimal or desired video quality (e.g., resolution) or format that may be displayed at the client device, and the video quality server may identify a version of the content matching the optimal or desired video quality. For example, the video quality server may determine the optimal or desired video quality based upon the retrieved device parameter data, and may identify a corresponding content version at a CDN 105 of FIG. 1 (e.g., at an origin server 130 of FIG. 1) based upon video quality estimation data as generated by a VQS module 210 of FIG. 2.

At 720, a bitrate associated with the identified content version may be determined. In embodiments, the bitrate associated with the identified content version may be retrieved from a CDN 105. For example, the video quality server may retrieve bitrate information associated with one or more content versions from an origin server 130 or a VQS module 210.

At 725, a determination may be made whether the bitrate associated with the identified content version is less than a bandwidth available for delivery of content to the client device. In embodiments, the determination whether enough bandwidth is available for delivery of the identified content version to the client device may be made by the video quality server and may be based upon bandwidth available over an access network (e.g., bandwidth allocated to the delivery of content to a particular subscriber over a hybrid fiber-coaxial (HFC) network, mobile network, twisted pair network, or any other access network) or bandwidth available over a local area network (LAN) (e.g., bandwidth allocated to the client device by a CPE device such as a gateway device or any other device providing a LAN, such as a wireless local area network (WLAN)).

If, at 725, the determination is made that the bitrate associated with the identified content is not less than a bandwidth available for delivery of content to the client device, the process 700 may proceed to 730. At 730, a lower quality version of the content may be identified. For example, the video quality server may identify a version of the content having a lower level of quality than the previously identified version of content. The video quality server may identify the content version from a CDN 105 (e.g., origin server 130) based upon video quality information associated with each available version of the content. After the lower quality content version is identified, the video quality server may determine a bitrate associated with the content version at 720.

If, at 725, the determination is made that the bitrate associated with the identified content is less than a bandwidth available for delivery of content to the client device, the process 700 may proceed to 735. At 735, the identified content version may be delivered to the client device. In embodiments, the video quality server may output instructions requesting that one or more segments of the identified content version be delivered from the CDN 105 (e.g., origin server 130) to the client device. The instructions may be output to the CDN 105, wherein the instructions cause video segments associated with the identified content version to be output from the origin server 130 to the client device. The instructions may be output to the client device, wherein the instructions cause the client device to request video segments associated with the identified content version from the CDN 105 (e.g., origin server 130).

Figure 8:
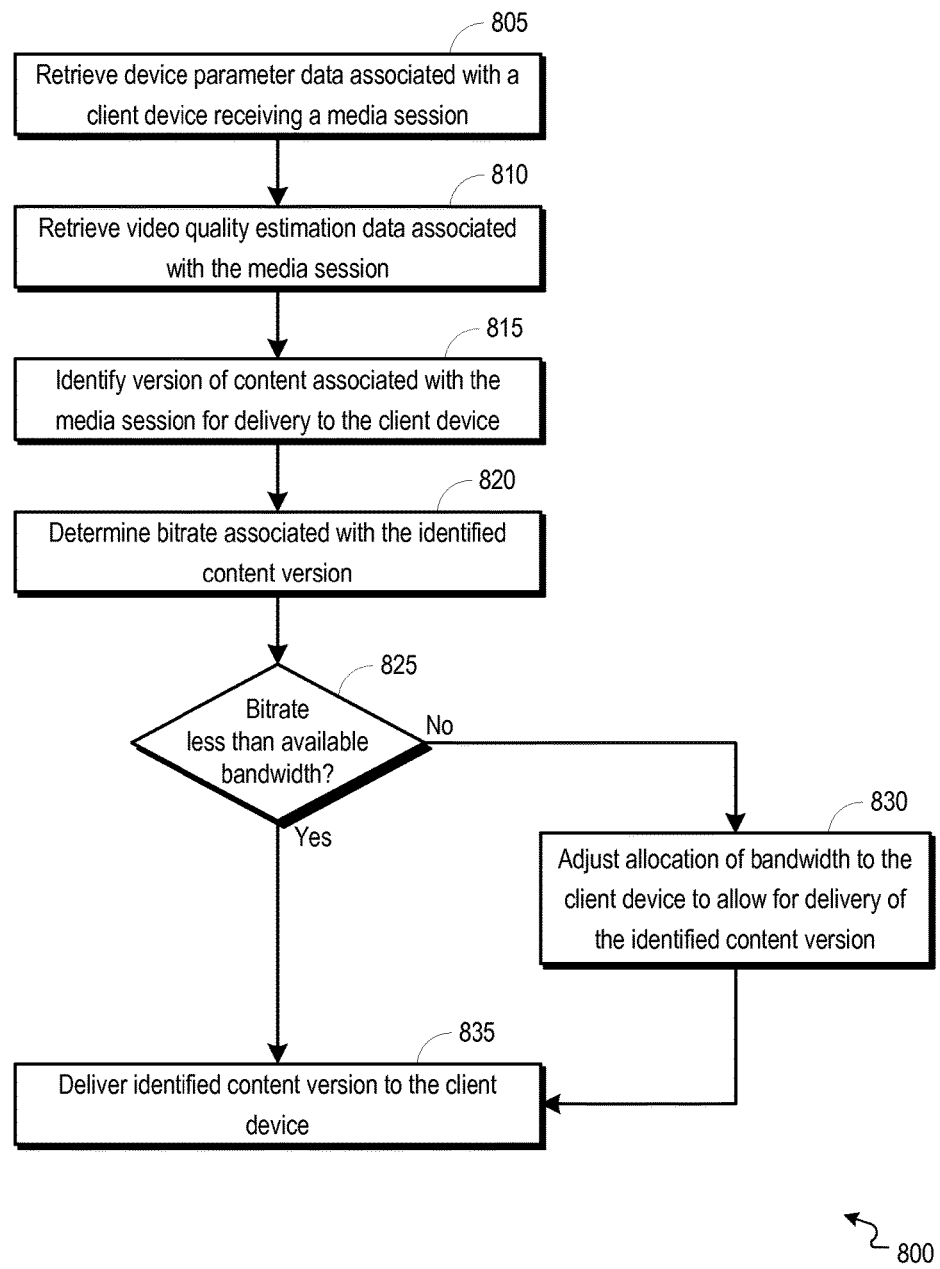
FIG. 8 is a flowchart illustrating an example process operable to allocate bandwidth to a media session based on an estimated video quality associated with the media session being received by a client device.

FIG. 8 is a flowchart illustrating an example process 800 operable to allocate bandwidth to a media session based on an estimated video quality associated with the media session being received by a client device. The process 800 may start at 805 where device parameter data associated with a client device receiving a media session is retrieved. Device parameter data may be retrieved from a client device (e.g., client device 135 of FIG. 1) by a video quality server (e.g., VQoE server 155 of FIG. 1).

At 810, video quality estimation data associated with the media session may be retrieved. Video quality estimation data may be retrieved, for example, by the video quality server. Video quality estimation data associated with the media session may be retrieved from a variety of sources including, but not limited to the client device (e.g., client device 135 of FIG. 1) receiving the media session, a CPE device (e.g., gateway 140 of FIG. 1) associated with the client device receiving the media session, a network device (e.g., router 150 of FIG. 1, headend device such as a CMTS 145 of FIG. 1, etc.) serving the client device receiving the media session, a CDN 105 of FIG. 1 delivering the media session to the client device, and others. In embodiments, video quality estimation data may be aggregated with device parameter data associated with the client device, and the aggregated data may be stored at the video quality server or at another server (e.g., video quality statistics database 160 of FIG. 1).

At 815, a version of the content associated with the media session may be identified based upon device parameter data associated with the client device. In embodiments, the video quality server may determine an optimal or desired video quality (e.g., resolution) or format that may be displayed at the client device, and the video quality server may identify a version of the content matching the optimal or desired video quality. For example, the video quality server may determine the optimal or desired video quality based upon the retrieved device parameter data, and may identify a corresponding content version at a CDN 105 of FIG. 1 (e.g., at an origin server 130 of FIG. 1) based upon video quality estimation data as generated by a VQS module 210 of FIG. 2.

At 820, a bitrate associated with the identified content version may be determined. In embodiments, the bitrate associated with the identified content version may be retrieved from a CDN 105. For example, the video quality server may retrieve bitrate information associated with one or more content versions from an origin server 130 or a VQS module 210.

At 825, a determination may be made whether the bitrate associated with the identified content version is less than a bandwidth available for delivery of content to the client device. In embodiments, the determination whether enough bandwidth is available for delivery of the identified content version to the client device may be made by the video quality server and may be based upon bandwidth available over an access network (e.g., bandwidth allocated to the delivery of content to a particular subscriber over a hybrid fiber-coaxial (HFC) network, mobile network, twisted pair network, or any other access network) or bandwidth available over a local area network (LAN) (e.g., bandwidth allocated to the client device by a CPE device such as a gateway device or any other device providing a LAN, such as a wireless local area network (WLAN)).

If, at 825, the determination is made that the bitrate associated with the identified content is not less than a bandwidth available for delivery of content to the client device, the process 800 may proceed to 830. At 830, an allocation of bandwidth to the client device may be adjusted such that the identified content version may be delivered to the client device. An allocator controlling bandwidth allocation over an access network (e.g., allocator located at the VQoE server 155 of FIG. 1 or at any one of various devices located within a delivery network 110 of FIG. 1 such as a router 150 of FIG. 1, CMTS 145 of FIG. 1, etc.) may increase the bandwidth allocated to a subscriber associated with the client device or bandwidth allocated to the delivery of a specific service to the client device. An allocator controlling bandwidth allocation over a LAN (e.g., allocator located at a CPE device such as a gateway device 140 of FIG. 1 or at the client device itself) may increase the bandwidth allocated to the client device or bandwidth allocated to the delivery of a specific service (e.g., video) to the client device. The bandwidth allocated to the client device may be increased by an amount sufficient to allow the identified content version to be delivered to the client device. For example, the allocated bandwidth may be increased to account for the bitrate associated with the identified content version. After the bandwidth allocated to the client device is adjusted, the identified content version may be delivered to the client device at 835.

If, at 825, the determination is made that the bitrate associated with the identified content is less than a bandwidth available for delivery of content to the client device, the process 800 may proceed to 835. At 835, the identified content version may be delivered to the client device. In embodiments, the video quality server may output instructions requesting that one or more segments of the identified content version be delivered from the CDN 105 (e.g., origin server 130) to the client device. The instructions may be output to the CDN 105, wherein the instructions cause video segments associated with the identified content version to be output from the origin server 130 to the client device. The instructions may be output to the client device, wherein the instructions cause the client device to request video segments associated with the identified content version from the CDN 105 (e.g., origin server 130).

Figure 9:
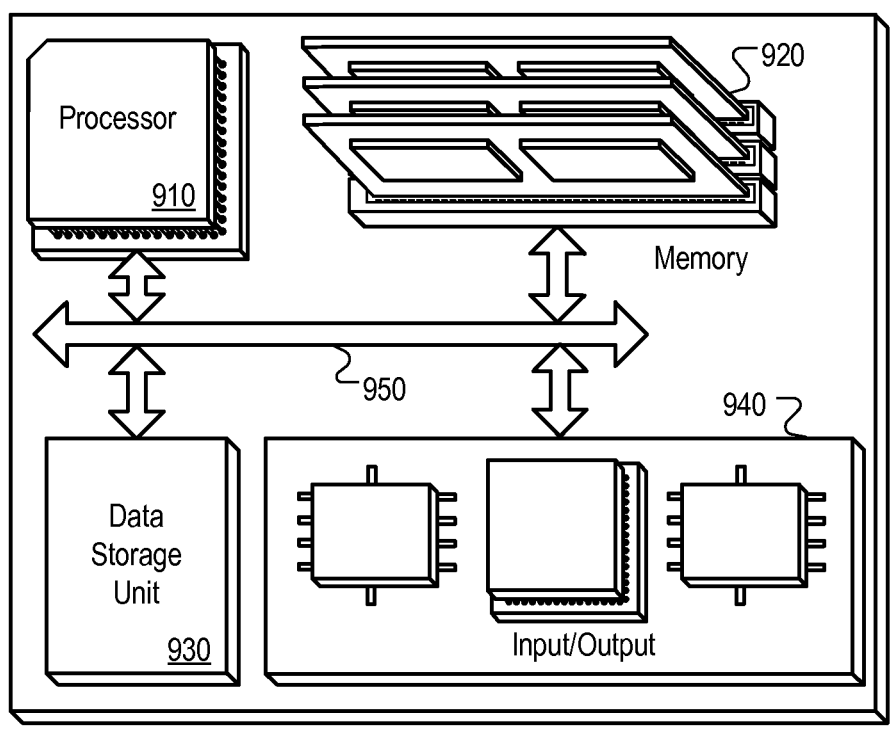
FIG. 9 is a block diagram of a hardware configuration operable to facilitate an analysis and control of video quality of experience (VQoE) of services delivered to one or more client devices.

FIG. 9 is a block diagram of a hardware configuration 900 operable to facilitate an analysis and control of video quality of experience (VQoE) of services delivered to one or more client devices. It should be understood that the hardware configuration 900 can exist in various types of devices. The hardware configuration 900 can include a processor 910, a memory 920, a storage device 930, and an input/output device 940. Each of the components 910, 920, 930, and 940 can, for example, be interconnected using a system bus 950. The processor 910 can be capable of processing instructions for execution within the hardware configuration 900. In one implementation, the processor 910 can be a single-threaded processor. In another implementation, the processor 910 can be a multi-threaded processor. The processor 910 can be capable of processing instructions stored in the memory 920 or on the storage device 930.

The memory 920 can store information within the hardware configuration 900. In one implementation, the memory 920 can be a computer-readable medium. In one implementation, the memory 920 can be a volatile memory unit. In another implementation, the memory 920 can be a non-volatile memory unit.

In some implementations, the storage device 930 can be capable of providing mass storage for the hardware configuration 900. In one implementation, the storage device 930 can be a computer-readable medium. In various different implementations, the storage device 930 can, for example, include a hard disk device, an optical disk device, flash memory or some other large capacity storage device. In other implementations, the storage device 930 can be a device external to the hardware configuration 900.

The input/output device 940 provides input/output operations for the hardware configuration 900. In embodiments, the input/output device 940 may include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., CDN 105 of FIG. 1, access networks, LAN, etc.), one or more access devices (e.g., router 150 of FIG. 1, CMTS 145 of FIG. 1, etc.) and/or one or more customer devices (e.g., CPE device such as a gateway 140 of FIG. 1, client device 135 of FIG. 1, etc.).

Those skilled in the art will appreciate that the invention improves upon methods and apparatuses for monitoring video quality of experience (VQoE) at a client device. The methods, systems, and computer readable media described herein can be operable to facilitate an analysis and control of VQoE of services delivered to one or more client devices. A content version segment may be selected for delivery to a client device based upon an estimation of the video quality experienced by the client device and the bandwidth available for delivering content to the client device. Video quality estimation may be based upon information associated with the encoding of a media stream coupled with one or more parameters of the client device receiving the media stream. Video quality estimation for one or more client devices may be aggregated and displayed to a service operator and/or may be used to inform content selection decisions in an adaptive bit-rate delivery method.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
retrieving device parameter information associated with a client device receiving a media stream associated with a piece of media content, wherein the media stream comprises one or more video segments associated with a first version of a plurality of versions of the piece of media content, and wherein the device parameter information comprises an identification of a device type associated with the client device and display capabilities associated with the client device;
retrieving video quality estimation information associated with the media stream being received at the client device, wherein video quality estimation information is generated for each respective version of the plurality of versions of the piece of media content and is based, at least in part on an encoding bit-rate associated with the respective content version and display parameters associated with the client device, and wherein video quality estimation information provides an indication of the video quality of experience for a display of the media content at the client device;
aggregating the device parameter information and video quality estimation information;
based upon the aggregated device parameter information and video quality estimation information, identifying an optimal video quality for the display of video at the client device;
identifying a version from the plurality of versions of the piece of media content, the identified version having video quality estimation information matching the identified optimal video quality;
determining a bitrate associated with the identified version of the piece of content;
determining that a bandwidth available for delivery of the media content to the client device does not support the bitrate associated with the identified version of the piece of content; and
increasing an allocation of bandwidth to the client device to provide enough bandwidth to support the delivery of the identified version of the piece of media content to the client device.

2. The method of claim 1, further comprising, outputting a message to a device controlling content version selection for the client device, the message serving to notify the device to request one or more media segments associated with the identified version of the piece of media content from a content origin server.

3. The method of claim 1, further comprising, outputting a message to the client device, the message serving to notify the client device to request one or more media segments associated with the identified version of the piece of media content from a content origin server.

4. The method of claim 1, wherein video quality estimation information is generated for each switch unit of each media stream, wherein a switch unit comprises a closed group of pictures.

5. The method of claim 1, wherein video quality estimation is generated for one or more segments associated with one or more versions of the piece of media content by performing video quality estimation on one or more segments of a source stream for the piece of media content.

6. The method of claim 1, wherein video quality estimation information is generated for each respective version of the plurality of versions of the piece of media content by performing video quality estimation on one or more uncompressed media stream segments.

7. The method of claim 1, wherein video quality estimation information is generated for each respective version of the plurality of versions of the piece of media content by performing video quality estimation on one or more compressed media stream segments.

8. The method of claim 7, wherein performing video quality estimation comprises performing peak signal-to-noise ratio (PSNR) normalization on one or more compressed media stream segments.

9. The method of claim 1, wherein:
the video quality estimation information is embedded in the media stream being output to the client device;
the video quality estimation information is extracted from the media stream by an access device forwarding the media stream to the client device; and
the extracted video quality estimation information is retrieved from the access device.

10. The method of claim 1, wherein video quality estimation information is retrieved from a content delivery network.

* * * * *